United States Patent
Yates et al.

(10) Patent No.: US 10,489,719 B2
(45) Date of Patent: Nov. 26, 2019

(54) SHARED PER CONTENT PROVIDER PREDICTION MODELS

(71) Applicant: Facebook, Inc., Menlo Park, CA (US)

(72) Inventors: Andrew Donald Yates, San Francisco, CA (US); Kurt Dodge Runke, Los Altos, CA (US); Gunjit Singh, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 583 days.

(21) Appl. No.: 15/261,746

(22) Filed: Sep. 9, 2016

(65) Prior Publication Data
US 2018/0075367 A1    Mar. 15, 2018

(51) Int. Cl.
*G06Q 50/00* (2012.01)
*G06Q 30/02* (2012.01)
*G06N 20/00* (2019.01)

(52) U.S. Cl.
CPC ......... *G06N 20/00* (2019.01); *G06Q 30/0269* (2013.01); *G06Q 50/01* (2013.01)

(58) Field of Classification Search
CPC .............. G06Q 30/0269; G06Q 50/01; G06F 17/30964; G06N 99/005
See application file for complete search history.

(56) References Cited

U.S. PATENT DOCUMENTS

| | | | |
|---|---|---|---|
| 9,235,804 B1* | 1/2016 | Bieniasz-Krzywiec | ..................... H04W 4/021 |
| 2011/0035272 A1* | 2/2011 | Bhatt | ..................... G06Q 30/02 705/14.42 |
| 2011/0246406 A1* | 10/2011 | Lahav | ..................... G06Q 30/02 706/46 |
| 2011/0258049 A1* | 10/2011 | Ramer | ..................... G06Q 30/02 705/14.66 |
| 2012/0022952 A1* | 1/2012 | Cetin | ..................... G06Q 10/04 705/14.73 |
| 2015/0074020 A1* | 3/2015 | Arpat | ..................... G06Q 10/10 706/12 |
| 2015/0237115 A1* | 8/2015 | Kirillov | .................. H04L 67/10 709/201 |
| 2016/0162503 A1* | 6/2016 | Yao | ..................... G06F 16/9535 707/723 |
| 2016/0171382 A1* | 6/2016 | Brewer | .................. G06Q 50/00 706/11 |
| 2016/0328738 A1* | 11/2016 | Liu | ..................... G06Q 30/0242 |
| 2017/0061528 A1* | 3/2017 | Arora | ................ G06F 16/24578 |

* cited by examiner

*Primary Examiner* — Scott A. Waldron
*Assistant Examiner* — Randall K. Baldwin
(74) *Attorney, Agent, or Firm* — Fenwick & West LLP

(57) ABSTRACT

An online system, such as a social networking system, generates shared models for one or more clusters of categories. A shared model for a cluster is common to the categories assigned to the cluster. In this manner, the shared models are specific to the group of categories (e.g., selected content providers) in each cluster while requiring a reasonable computational complexity for the online system. The categories are clustered based on the performance of a model specific to a category on data for other categories.

11 Claims, 9 Drawing Sheets

*Aggregated Training Data for Content Provider "Travel City" and Content Provider "Toy Store"*

| | Item No. (1) | # Interaction (2) | Conversion (3) | Budget Remaining (4) | Includes "Vacation" (5) | Includes "Discount" (6) | Includes "Safe" (5) |
|---|---|---|---|---|---|---|---|
| "Travel City" | 1 | 23 | 10 | 500 | 1 | 1 | 0 |
| | 2 | 65 | 23 | 436 | 0 | 0 | 0 |
| | 3 | 15 | 15 | 789 | 1 | 1 | 0 |
| | 4 | 145 | 25 | 542 | 0 | 1 | 0 |
| | 5 | 78 | 16 | 569 | 0 | 1 | 0 |
| "Toy Store" | 1 | 12 | 0 | 414 | 0 | 0 | 0 |
| | 2 | 120 | 36 | 563 | 0 | 0 | 0 |
| | 3 | 63 | 20 | 781 | 0 | 1 | 1 |
| | 4 | 8 | 2 | 368 | 0 | 0 | 1 |
| | 5 | 54 | 26 | 526 | 0 | 1 | 0 |

444AB

*Training Data for Content Provider "Travel City" (Account ID#: 43940)*

| Item No. (1) | # Interaction (2) | Conversion (3) | Budget Remaining (4) | Includes "Vacation" (5) | Includes "Discount" (6) |
|---|---|---|---|---|---|
| 1 | 23 | 10 | 500 | 1 | 1 |
| 2 | 65 | 23 | 436 | 0 | 0 |
| 3 | 15 | 15 | 789 | 1 | 1 |
| 4 | 145 | 25 | 542 | 0 | 1 |
| 5 | 78 | 16 | 569 | 0 | 1 |

*Training Data for Content Provider "Toy Store" (Account ID#: 54353)*

| Item No. (1) | # Interaction (2) | Conversion (3) | Budget Remaining (4) | Includes "Safe" (5) | Includes "Discount" (6) |
|---|---|---|---|---|---|
| 1 | 12 | 0 | 414 | 0 | 0 |
| 2 | 120 | 36 | 563 | 0 | 0 |
| 3 | 63 | 20 | 781 | 1 | 1 |
| 4 | 8 | 2 | 368 | 1 | 0 |
| 5 | 54 | 26 | 526 | 0 | 1 |

*Aggregated Training Data for Content Provider "Travel City" and Content Provider "Toy Store"*

| Item No. (1) | # Interaction (2) | Conversion (3) | Budget Remaining (4) | Includes "Vacation" (5) | Includes "Discount" (6) | Includes "Safe" (5) |
|---|---|---|---|---|---|---|
| 1 | 23 | 10 | 500 | 1 | 1 | 0 |
| 2 | 65 | 23 | 436 | 0 | 0 | 0 |
| 3 | 15 | 15 | 789 | 1 | 1 | 0 |
| 4 | 145 | 25 | 542 | 0 | 1 | 0 |
| 5 | 78 | 16 | 569 | 0 | 0 | 0 |
| 1 | 12 | 0 | 414 | 0 | 0 | 0 |
| 2 | 120 | 36 | 563 | 0 | 1 | 0 |
| 3 | 63 | 20 | 781 | 0 | 0 | 1 |
| 4 | 8 | 2 | 368 | 0 | 0 | 1 |
| 5 | 54 | 26 | 526 | 0 | 1 | 0 |

Rows 1-5: "Travel City"; Rows 6-10: "Toy Store"

SHARED PER CONTENT PROVIDER PREDICTION MODELS

BACKGROUND

This invention relates generally to training machine-learned models, and more particularly to training machine-learned models to predict user responses in sponsored content items.

It is advantageous to generate predictions for instances to improve functionality of an online system. For example, a prediction about whether a user will perform a certain action when presented with a content item can help a system to select the best content items to present to a user to induce desired responses from users in an online system. The predictions are often generated through machine-learned models that predict values for certain characteristics of instances given a set of features extracted from the instances. Often times, the instances are associated with multiple categories. For example, sponsored content items are associated with different content providers that manage the sponsored content items. However, constructing a single machine-learned model that generates predictions for a large number of different categories may result in lack of prediction accuracy due to disregarding differences between individual categories. On the other hand, constructing many machine-learned models for each category may require significant amount of computational resources to maintain the models.

SUMMARY

An online system, such as a social networking system, generates shared models for one or more clusters of categories. A shared model for a cluster is common to the categories assigned to the cluster. In this manner, the shared models are specific to the group of categories (e.g., selected content providers) in each cluster and provide good prediction accuracy while requiring a reasonable computational complexity for the online system. The online system also generates a general model for all selected categories in case the shared models cannot be used, or if a prediction needs to be generated for a category that is not assigned to any cluster.

The online system initially constructs models for each selected category. The categories are then clustered based on the performance of each model on data of other categories. The online system trains shared models for the categories assigned to each cluster. In one instance, the online system identifies an optimal number of shared models that minimizes a loss dependent on average prediction accuracy and/or required computational complexity of the models. Predictions for an instance associated with a category can be generated by applying the shared model for the cluster to which the category is assigned.

BRIEF DESCRIPTION OF THE DRAWINGS

FIGS. 5A and 5B illustrate general structures of training data for two content providers.

FIG. 6 illustrates training data aggregated from training data shown in FIGS. 5A and 5B.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
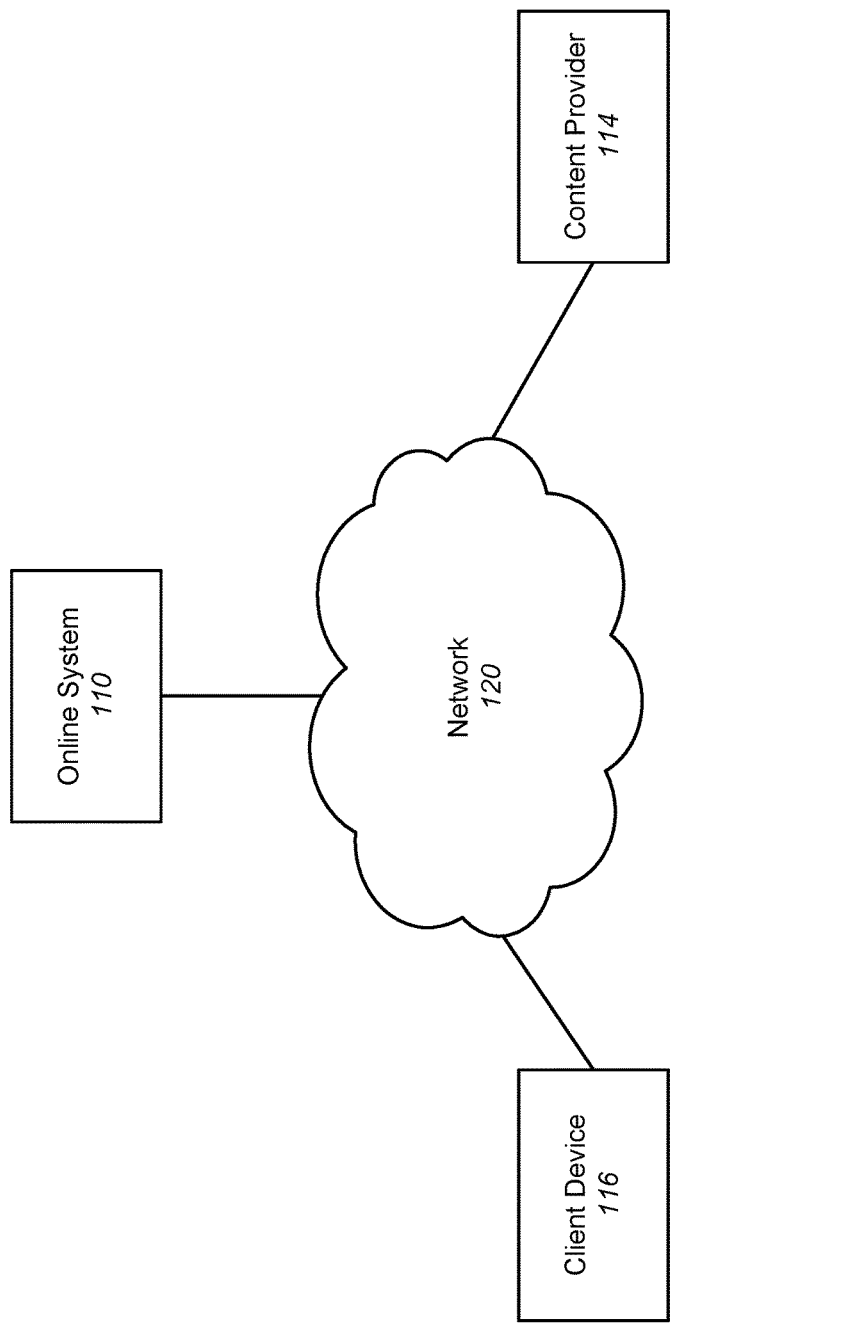
FIG. 1 is a high level block diagram of a system environment for an online system, such as a social networking system, in accordance with an embodiment.

FIG. 1 is a high level block diagram of a system environment for an online system, such as a social networking system, in accordance with an embodiment. The system environment 100 shown by FIG. 1 comprises one or more client devices 116, a network 120, one or more content providers 114, and the online system 110. In alternative configurations, different and/or additional components may be included in the system environment 100. The embodiments described herein can be adapted to online systems that are not social networking systems, such as advertising systems or ad publishing systems.

The client device 116 is a computing device capable of receiving user input as well as communicating via the network 120. While a single client device 116 is illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120. In one embodiment, a client device 116 executes an application allowing a user of the client device 116 to interact with the online system 110. For example, a client device 116 executes a browser application to enable interaction between the client device 116 and the online system 110 via the network 120. In another embodiment, the client device 116 interacts with the online system 110 through an application programming interface (API) running on a native operating system of the client device 116, such as IOS® or ANDROID™.

The client devices 116 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more content providers 114 may be coupled to the network 120 for communicating with the online system 110. The content providers 114 are one or more entities interested in promoting the subjects of sponsored content items ("sponsored items"). The subject of a sponsored item may be, for example, a product, a cause, or an event. The content providers 114 may be a business or organization associated with the sponsored item that owns or manages the subject of the sponsored item, or may be an agency hired by the business or entity to promote the subject of the sponsored item. In one particular embodiment referred to throughout the application, a sponsored content item may be an advertisement provided by an advertiser, but is not limited thereto.

The content providers 114 provide one or more sponsored content item requests ("sponsored item requests") to the online system 110 that include sponsored items to be served to the client devices 116 along with various optional parameters associated with the sponsored items that determine how the sponsored items will be presented. For example, the sponsored item requests provided by the content providers 114 may include a sponsored content item and targeting criteria specified by the content providers 114 that indicate characteristics of users that are to be presented with the sponsored item. As another example, the sponsored item requests may also include a specified budget for the sponsored content item that indicates how much the content provider 114 associated with the item is willing to spend to present the item to users of the online system 110. The sponsored item requests are stored in the online system 110.

The content providers 114 may also specify a campaign containing a series of sponsored items to the online system 110. The sponsored items in a campaign contain different content but commonly share a single theme. For example, a series of sponsored items in a campaign may promote the same product, business, or organization but with various forms of content. In one particular embodiment referred to throughout the remainder of the specification, a sponsored item may refer to a single sponsored item, or may refer to any sponsored item in a series of items for a campaign.

Online System

Figure 2:
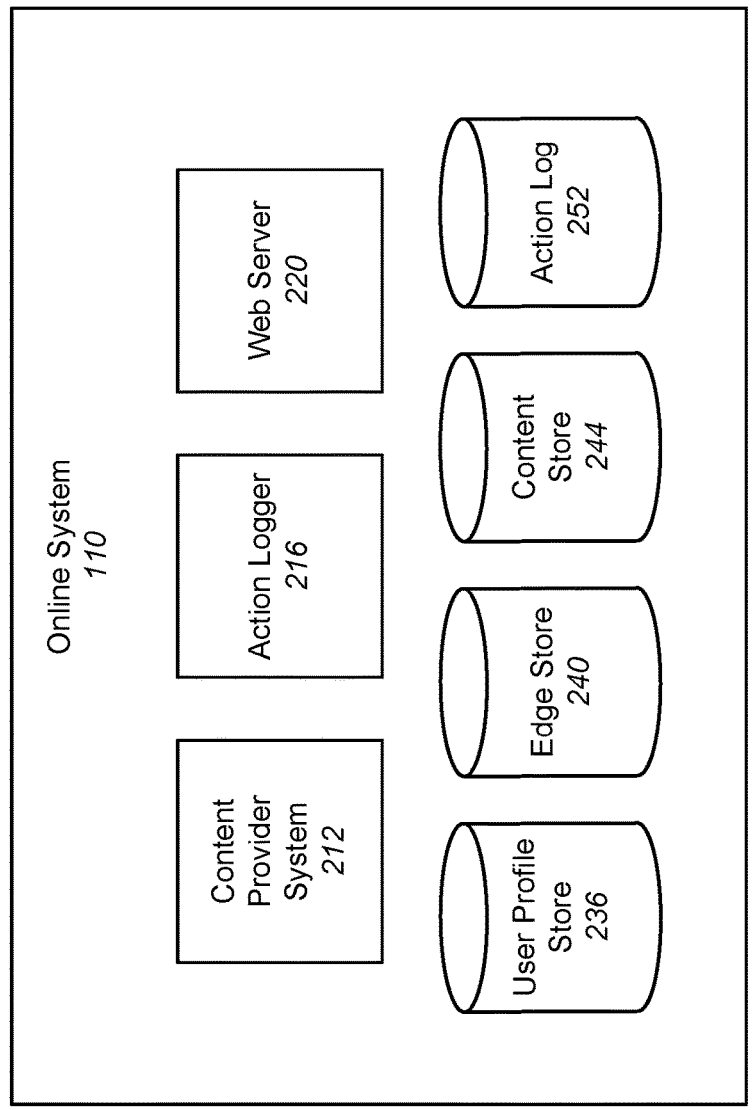
FIG. 2 is an example block diagram of an architecture of the online system, in accordance with an embodiment.

FIG. 2 is an example block diagram of an architecture of the online system 110, in accordance with an embodiment. The online system 110 shown in FIG. 2 includes a user profile store 236, an edge store 240, a social content store 244, an action log 252, a content provider system 212, an action logger 216, and a web server 220. In other embodiments, the online system 110 may include additional, fewer, or different components for various applications. Conventional components such as network interfaces, security functions, load balancers, failover servers, management and network operations consoles, and the like are not shown so as to not obscure the details of the system architecture. In the example provided below, the online system 110 includes various social networking and advertising components, though other embodiments may not relate to social networking or may not relate to advertising.

Each user of the online system 110 is associated with a user profile, which is stored in the user profile store 236. A user profile includes declarative information about the user that was explicitly shared by the user and may also include profile information inferred by the online system 110. In one embodiment, a user profile includes multiple data fields, each describing one or more attributes of the corresponding user of the online system 110. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 110 displayed in an image. A user profile in the user profile store 236 may also maintain references to actions by the corresponding user performed on content items in the social content store 244 and are stored in the action log 252.

While user profiles in the user profile store 236 are frequently associated with individuals, allowing individuals to interact with each other via the online system 110, user profiles may also be stored for entities such as businesses or organizations. This allows an entity to establish a presence on the online system 110 for connecting and exchanging content with other online system 110 users. The entity may post information about itself, about its products or provide other information to users of the online system 110 using a brand page associated with the entity's user profile. Other users of the online system 110 may connect to the brand page to receive information posted to the brand page or to receive information from the brand page. A user profile associated with the brand page may include information about the entity itself, providing users with background or informational data about the entity.

The social content store 244 stores objects that each represents various types of social content. Examples of social content represented by an object include a page post, a status update, a photograph, a video, a link, a shared content item, a gaming application achievement, a check-in event at a local business, a brand page, or any other type of content. Online system users may create objects stored by the social content store 244, such as status updates, photos tagged by users to be associated with other objects in the online system 110, events, groups or applications. In some embodiments, objects are received from third-party applications or third-party applications separate from the online system 110. In one embodiment, objects in the content store 244 represent single pieces of social content, or social content "items." Hence, users of the online system 110 are encouraged to communicate with each other by posting text and social content items of various types of media through various communication channels. This increases the amount of interaction of users with each other and increases the frequency with which users interact within the online system 110.

The action logger 216 receives communications about user actions internal to and/or external to the online system 110, populating the action log 252 with information about user actions. Examples of actions include adding a connection to another user, sending a message to another user, uploading an image, reading a message from another user, viewing social content associated with another user, attending an event posted by another user, among others. In addition, a number of actions may involve an object and one or more particular users, so these actions are associated with those users as well and stored in the action log 252.

The action log 252 may be used by the online system 110 to track user actions on the online system 110, as well as actions on third party systems that communicate information to the online system 110. Users may interact with various objects on the online system 110, and information describing these interactions is stored in the action log 252. Examples of interactions with objects include commenting on posts, sharing links, and checking-in to physical locations via a mobile device, accessing content items, and any other interactions. Additional examples of interactions with objects on the online system 110 that are included in the action log 252 include commenting on a photo album, communicating with a user, establishing a connection with an object, joining an event to a calendar, joining a group, creating an event, authorizing an application, using an application, expressing a preference for an object ("liking" the object) and engaging in a transaction. In some embodiments, data from the action log 252 is used to infer interests or preferences of a user, augmenting the interests included in the user's user profile and allowing a more complete understanding of user preferences.

The action log 252 may also store user actions taken on a third party system, such as an external website, and communicated to the online system 110. For example, an e-commerce website that primarily sells sporting equipment at bargain prices may recognize a user of an online system 110 through a social plug-in enabling the e-commerce website to identify the user of the online system 110. Because users of the online system 110 are uniquely identifiable, e-commerce websites, such as this sporting equipment retailer, may communicate information about a user's actions outside of the online system 110 to the online system 110 for association with the user. Hence, the action log 252 may record information about actions users perform on a third party system, including webpage viewing histories, advertisements that were engaged, purchases made, and other patterns from shopping and buying.

In one embodiment, an edge store 240 stores information describing connections between users and other objects on the online system 110 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 110, such as expressing interest in a page on the online system 110, sharing a link with other users of the online system 110, and commenting on posts made by other users of the online system 110.

In one embodiment, an edge may include various features each representing characteristics of interactions between users, interactions between users and object, or interactions between objects. For example, attributes included in an edge describe rate of interaction between two users, how recently two users have interacted with each other, the rate or amount of information retrieved by one user about an object, or the number and types of comments posted by a user about an object. The attributes may also represent information describing a particular object or user. For example, an attribute may represent the level of interest that a user has in a particular topic, the rate at which the user logs into the online system 110, or information describing demographic information about a user. Each attribute may be associated with a source object or user, a target object or user, and a feature value. An attribute may be specified as an expression based on values describing the source object or user, the target object or user, or interactions between the source object or user and target object or user; hence, an edge may be represented as one or more feature expressions.

The content provider system 212 presents sponsored content items to users of the online system 110 through client devices 116. Specifically, the content provider system 212 identifies presentation opportunities for users of client devices 116, and selects sponsored content items to be presented to the users. The sponsored content items are chosen to obtain positive responses from the users such as interacting with (e.g., clicking) the sponsored content items, or performing any other actions that are valuable to the business or organization associated with the item (e.g., purchasing the promoted subject of a sponsored item). The content provider system 212 selects sponsored items to be presented to users based on predictive characteristics of the sponsored content items or users generated by a series of shared machine-learned models. For example, the content provider system 212 may predict the degree of positive user responses for sponsored content items associated with a content provider 114 and select items that have the highest predicted values for presentation. A more detailed embodiment of the content provider system 212 is provided below in conjunction with FIG. 3.

The web server 220 links the online system 110 via the network 120 to the one or more client devices 116, as well as to the one or more third party systems. The web server 220 serves web pages, as well as other web-related content, such as JAVA®, FLASH®, XML and so forth. The web server 220 may receive and route messages between the online system 110 and the client device 116, for example, instant messages, queued messages (e.g., email), text messages, short message service (SMS) messages, or messages sent using any other suitable messaging technique. A user may send a request to the web server 220 to upload information (e.g., images or videos) that are stored in the social content store 244. Additionally, the web server 220 may provide application programming interface (API) functionality to send data directly to native client device operating systems, such as IOS®, ANDROID™, WEBOS® or RIM®.

Content Provider System

Figure 3:
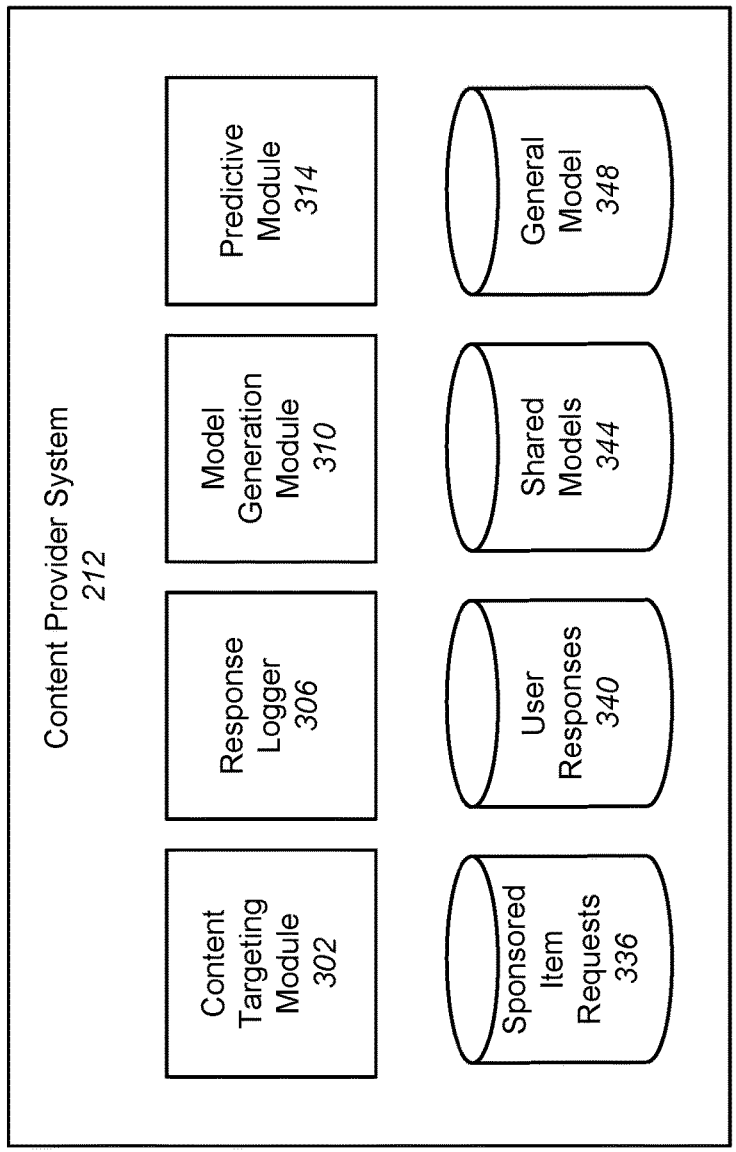
FIG. 3 is an example block diagram of an architecture of the content provider system, in accordance with an embodiment.

FIG. 3 is an example block diagram of an architecture of the content provider system 212, in accordance with an embodiment. The content provider system 212 shown in FIG. 3 includes a content targeting module 302, a response logger 306, a model generation module 310, and a predictive module 314. The content provider system 212 also includes sponsored item requests 336, user responses 340, shared models 344, and a general model 348. In other embodiments, the content provider system 212 may include additional, fewer, or different components for various applications. Conventional components such as network interfaces, security functions, load balancers, failover servers, management and network operations consoles, and the like are not shown so as to not obscure the details of the system architecture.

The sponsored item requests 336 store requests to present sponsored items to users of the online system 110 provided by the content providers 114. A sponsored item request 336 includes the sponsored content item promoting a subject of the item, and any optional parameters associated with the sponsored item, such as a specified bid amount or a budget for the sponsored item and/or targeting criteria for the sponsored item. The sponsored content is text, image, audio, video, or any other suitable data presented to a user that promotes the subject of the sponsored item. In various embodiments, the sponsored content also includes a landing page specifying a network address to which a user is directed when the sponsored item is accessed.

The bid amount for a sponsored item, which may be specified by the content provider 114 in the request, is used to determine an expected value, such as monetary compensation, provided by a content provider 114 to the online system 110 if the sponsored item is presented to a user, if the sponsored item receives a positive user response, or based on any other suitable condition. For example, the bid amount specifies a monetary amount that the online system 110 receives from the content provider 114 if the sponsored item is displayed and the expected value is determined by multiplying the bid amount by a probability of the sponsored item being accessed. In some cases, the content provider 114 may not provide a bid amount, but may instead provide a budget for a sponsored item or campaign, and the online system 110 determines how best to spend the budget and what amount to bid for presenting the sponsored item to users meeting the initial targeting criteria.

The content targeting module 302 identifies a presentation opportunity for a user of a client device 116 to be presented with one or more sponsored content items, and selects one or more candidate items in sponsored item requests 336. Responsive to a request from a client device 116 for a sponsored content item, the content targeting module 302 selects a sponsored item to serve to the client device 116 through an auction process based on the bid amounts associated with each candidate sponsored item request 336. In one embodiment, the content targeting module 302 selects sponsored content items based on predictive characteristics (e.g., degree of positive user response) of the sponsored content items or users generated by the predictive module 314. The selected item is presented to the user of the client device 116.

The response logger 306 records user responses to sponsored content items after users of the online system 110 have been presented with the sponsored content items on client devices 116. The user response may indicate whether a user interacted with the item, whether a user converted based on the item, or whether the user remained inactive in response to the item after a predetermined length of time. A user is said to have interacted with a sponsored content item if the user performs an action indicating engagement with the sponsored item. For example, the user may click on the item, hover the mouse pointer over the item, or view a video included in the sponsored content item, etc. A user is said to have converted after being presented with a sponsored content item if the user performs an action defined as being valuable to the business or organization associated with the item. For example, the user may execute an online purchase of a product promoted in the sponsored item through a third-party website, or place a phone call to the business or entity associated with the sponsored item. The user responses to the sponsored content items are stored as user responses 340.

The model generation module 310 constructs a series of shared machine-learned models for one or more clusters of categories. A shared model common to a cluster of categories generates predictive characteristics for instances associated with categories assigned to the cluster. In one particular example referred throughout the specification, the instances are sponsored content items and the one or more categories are different content providers 114 that the sponsored content items are associated with. Alternatively, as another example, the instances may be users and the one or more categories may be different demographic characteristics of the users (e.g., age groups, socio-economic status, and the like). Specifically, the shared models predict values for the variables of interest for an instance given a set of features for the instance.

The variables of interest are characteristics of the instances that the administrator of the content provider system 212 is interested in predicting for other instances. In one particular example referred throughout the specification, the variables of interest may be user response statistics such as how many percentage of users have converted for the sponsored item (e.g., eCVR) and/or how many percentage of users have interacted with the sponsored item (e.g., eCTR). In such an example, an objective of the shared models is to predict user responses for sponsored content items that have not yet been presented to users of the online system 110, which may be helpful in selecting sponsored content items to be presented given presentation opportunities from client devices 116. However, it is also appreciated that in other examples the variables of interest are any other variables that the administrator of the online system 110 may be interested in predicting, for example, to improve the degree of positive user responses to sponsored content items.

The set of features for an instance are identified characteristics of the instance that capture various aspects of the instance that are considered to impact the variables of interest for the instance. As an example, the set of features for a sponsored content item may be whether the content includes the phrase "discount," or a numerical value indicating the remaining budget on the item.

The model generation module 310 constructs the series of shared models by learning correlations between the set of features and variables of interest in training data that contain instances with known values for the variables of interest. For example, the training data may consist of sponsored content items that have previously been presented to users of the online system 110, in which the user responses to the content items are already known. Based on the learned correlations, the shared models can predict variables of interest for sponsored content items that have not been presented to users of the online system 110 given the values of their set of features. The shared models are repeatedly updated and maintained if new data becomes available.

One option for predicting the variables of interest is to train a single machine-learned model based on training data containing instances across all categories. For example, a single model may be trained based on training data for sponsored content items across all identified content providers 114. Although such an option may be easier to update and maintain, the prediction accuracy of the single model may suffer compared to that of multiple machine-learned models specific to each category. For example, the set of features considered to be predictive of the variables of interest may significantly differ for each content provider 114 depending on the industry of the content provider 114. Accordingly, a single machine-learned model may underestimate the predictive power of a set of features significant to a certain content provider 114 if the training data contains a small amount of data relevant to the certain category.

On the other hand, although constructing machine-learned models for each category may capture subtle details specific to each category, the prediction accuracy of the models may suffer because a small amount of training data is available per each category that is inadequate for learning the correlations between the set of features and variables of interest. Moreover, a large number of machine-learned models suggest that the online system 110 will spend a significant amount of time and computational resources in maintaining and updating the individual models.

To address this issue, the model generation module 310 constructs the shared models for one or more clusters of categories that are specific to each cluster. A shared model is common to categories assigned to a corresponding cluster, and provides good prediction accuracy while requiring reasonable computational complexity to maintain. The model generation module 310 initially constructs machine-learned models specific to each category in a set of categories. The categories are clustered based on the performance of the models on training data associated with other categories. A shared model is generated for each cluster. The number of shared models is less than the number of categories used to generate the clusters. The variables of interest for an instance associated with a category are predicted by using the shared model for the cluster that the category is assigned to.

In one embodiment, an optimal number of shared models is identified that minimizes a loss dependent on average prediction accuracy and/or required computational complexity. In one embodiment, the model generation module 310 also trains a general machine-learned model 348 for all selected categories in the event that a shared model fails for an instance. In such a case, the variables of interest for the instance are predicted using the general model 348. A more detailed embodiment of the model generation module 310 is provided below in conjunction with FIG. 4.

The predictive module 314 receives instances and generates predictions for the variables of interest using the shared models 344 and the general model 348. Responsive to receiving a request for prediction, the predictive module 314 identifies whether the category of the instance is assigned to a shared model 344. When the category is assigned to a custom model 344, the predictive module 314 generates the predictions for the instance by applying the shared model 344. In one instance, when no shared model is associated with the category, the predictive module 314 generates the predictions by applying the general model 348. In another instance, the predictive module 314 identifies a selected category assigned to a cluster that shares characteristics (e.g., content provider with same industry affiliation) common to the category, and generates the predictions by applying the shared model 344 for the cluster. The predicted values may be provided to the content targeting module 302.

In one embodiment, the predictive module 314 raises flags for events that indicate possible failure in the shared models 344, and provides the flagged events to the model generation module 310 such that the shared models may be refined if needed. In one instance, the predictive module 314 tracks the performance of the shared models 344 and flags an event if the prediction accuracy of the custom models 344 falls below a threshold. In another instance, the predictive module 314 flags an event if the values of one or more features critical for the shared models 344 are missing for the instances. In one embodiment, the predictive module 314 generates predictions for an instance by applying the general model 348 to the instance if a flag has been raised for the associated custom models 344.

Model Generation Module

Figure 4:
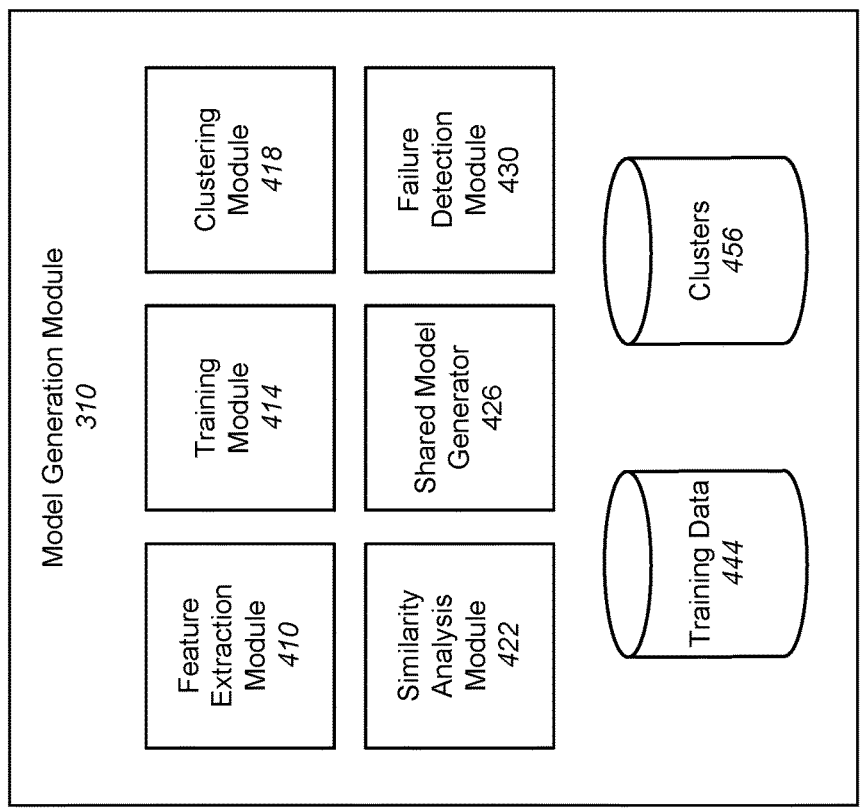
FIG. 4 is an example block diagram of an architecture of the optimization module 310, in accordance with an embodiment.

FIG. 4 is an example block diagram of an architecture of the model generation module 310, in accordance with an embodiment. The optimization module 310 shown in FIG. 4 includes a feature extraction module 410, a training module 414, a clustering module 418, a similarity analysis module 422, a shared model generator 426, and a failure detection module 430. The model generation module 310 also includes training data 444 and clusters 456. In other embodiments, the model generation module 310 may include additional, fewer, or different components for various applications. Conventional components such as network interfaces, security functions, load balancers, failover servers, management and network operations consoles, and the like are not shown so as to not obscure the details of the system architecture.

The feature extraction module 410 identifies and extracts training data from instances associated with identified categories that already have known values for variables of interest. The training data for a category c include values for the set of p features $x^c = \{x^{c,1}, x^{c,2}, \ldots, x^{c,p}\}$, and q variables of interest $y^c = \{y^{c,1}, y^{c,2}, \ldots, y^{c,q}\}$ for n instances associated with category c. The number of features p, the number of variables of interest q, and the number of sponsored content items n may differ across each category. Thus, the training data $T^c$ for category c having data for n associated instances are given by pairs $T^c = \{(x^c_1, y^c_1), (x^c_2, y^c_2), \ldots, (x^c_n, y^c_n)\}$, in which $(x^c_i, y^c_i)$ indicate corresponding values for instance i. The training data can be used by the optimization module 310 to learn correlations between the set of features and variables of interest for instances such that variables of interest can be predicted for other instances based on the set of features and the learned correlations.

FIGS. 5A and 5B illustrate general structures of training data for two content providers "Travel City" (content provider #1) and "Toy Store" (content provider #2). The set of identified features or variables of interest may be different across content providers 114. As shown in FIG. 5A, an example subset of the training data 444A for content provider "Travel City" includes data for 5 sponsored content items, each with two variables of interest $y^{1,1}$, $y^{1,2}$ (Columns 2 and 3) and a set of three features $x^{1,1}$, $x^{1,2}$, $x^{1,3}$ (Columns 4, 5, and 6). Columns 2 and 3 are variables of interest that indicate the number of users of the online system 110 who were presented with each sponsored content item and interacted with the sponsored item or converted on the sponsored item. Column 4 is a feature indicating the remaining budget on each sponsored content item. Columns 5 and 6 are features indicating whether each sponsored item includes the word "vacation" and "discount." As shown in FIG. 5B, the training data 444B for content provider "Toy Store" include variables of interest $y^{2,1}$, $y^{2,2}$ (Columns 2 and 3) and two features $x^{2,1}$, $x^{2,3}$ that are common to that of content provider "Travel City," (i.e., $y^{1,1}=y^{2,1}$, $y^{1,2}=y^{2,2}$, $x^{1,1}=x^{2,1}$, $x^{1,3}=x^{2,3}$), but in which the second feature $x^2_2$ is uncommon to that of content provider "Travel City" (i.e., $x^{1,2} \neq x^{2,2}$).

The training data for two or more categories may be "aggregated" by combining the instances from each training data and "unionizing" the set of features for each of the two or more categories. Specifically, the added features in the unionized set that are not associated with a specific category may be zeroed out for that category. FIG. 6 illustrates training data 444AB aggregated from training data shown in FIGS. 5A and 5B, in accordance with an embodiment. In aggregated training data 444AB, the data from 444A and 444B are aggregated by combining the entries of each content provider 114 into 10 entries and unionizing the set of features for each content provider 114 into a new set of four features $\{x^{1,1}=x^{2,1}, x^{1,2}, x^{1,3}=x^{3,1}, x^{2,2}\}$ that are now associated with both content providers 114 "Travel City" and "Toy Store." In the unionized set of features, the values of feature $x^{1,2}$ indicating whether the sponsored item includes the phrase "vacation" in entries of content provider "Toy Store" are 0, since the feature is irrelevant to the content provider "Toy Store." Similarly, the values of $x^{2,2}$ indicating whether the sponsored item includes the phrase "safe" in entries of content provider "Travel City" are 0, since the feature is irrelevant to the content provider "Travel City."

Returning to FIG. 4, the training module 414 generates a machine-learned model that determines the relationship between a set of features and corresponding variables of interest. Specifically, the training module 414 receives training data having n instances $T=\{(x_1, y_1), (x_2, y_2), \ldots, (x_n, y_n)\}$, in which each instance i includes values for a set of features $x_i$, and values for variables of interest $y_i$. Given the n pairs, the training module 414 generates a machine-learned model that describes the relationship between the set of features and variables of interest by minimizing a training loss L(T) associated with the received training data. In one instance, the machine-learned models are decision-tree based models, such as gradient-boosted trees, random forests, and the like. In another instance, the machine-learned models are neural-network based models such as artificial neural networks (ANN), convolutional neural networks (CNN), deep neural networks (DNN), and the like. In yet another instance, the machine-learned models are linear additive models such as linear regression models, logistic regression models, support vector machine (SVM) models, and the like. Given values for the set of features for an instance, the machine-learned model is capable of predicting values for the variables of interest of the instance.

In one embodiment, responsive to training a machine-learned model, the training module 414 also returns an error of the model. The error of a model quantifies how much a model failed to predict the variables of interest given the true values of the variables of interest indicated in the training data, and is a metric representing the prediction capability of the model. In one embodiment, the training module 414 returns the error on a model by constructing the machine-learned model based on a subset of the received training data, and evaluating the error on the remaining validation subset of training data. The error is measured by comparing the similarities between the "true" values for variables of interest in the validation subset against the predicted values for the variables of interest generated by applying the machine-learned model to the instances in the validation subset.

The clustering module 418 receives a set of data points represented by S vectors $\{v_1, v_2, \ldots, v_S\}$ and groups the set of data points into J clusters, in which J is equal to or smaller than S (J ≤S). The data points assigned to a cluster have small distances between one another in the dimensionality of the vectors and satisfies a predetermined distance metric criterion. For example, a data point assigned to a cluster may have a distance metric from the center point of the cluster equal to or less than a predetermined threshold. In one embodiment, the clustering module 418 identifies the J clusters through clustering algorithms such as the K-means algorithm, fuzzy c-means algorithm, hierarchical clustering algorithms, Gaussian mixture models, quality threshold clustering algorithms, minimum spanning tree (MST) based algorithms, kernel K-means algorithms, and density based clustering algorithms, and the like. In another embodiment, the clustering module 418 also identifies the J clusters through directed acyclic graphs (DAG).

The similarity analysis module 422 requests machine-learned models for a group of S "seeds" among the categories, and conducts a similarity analysis on the performance of the machine-learned models on training data of other seeds. Specifically, the seeds are selected groups of one or more categories that have sufficient training data to generate a machine-learned model for the seed. In one instance, the seeds are individual categories, such as individual content providers 114 that provide the highest number of sponsored item requests 336 to the online system 110, or provide the highest budget to the online system 110 for the sponsored item requests 336. In such an instance, the set of training data for a seeds $T_s$ is given by the corresponding training data for the category (i.e., $T^c$). In another instance, the seeds are groups of categories, such as groups of content providers 114 that are operating within similar industries, such as e-commerce, travel, education, or the like. In such an instance, the training data for a seed s $T_s$ is given by aggregating the training data for the categories included in that seed.

The similarity analysis module 422 initially identifies a predetermined number S of seeds among the categories in the online system 110 and requests machine-learned models for each of the identified seeds. The models are constructed based on the training data of the seeds. Specifically, the similarity analysis module 422 provides the training data for each of the seeds and a predetermined training loss function to the training module 414, such that the training module 414 generates a machine-learned model for each seed that minimizes the given function. Thus, the similarity analysis module 422 receives S machine-learned models $\{ML_1, ML_2, \ldots, ML_S\}$ from the training module 414, in which $ML_s$ indicates a machine-learned model that predicts variables of interest for categories associated with seed s, given the unionized set of features for the categories.

The similarity analysis module 422 applies the machine-learned model for each seed to the training data of other seeds, and generates a similarity matrix that indicates the evaluated error of each machine-learned model on the training data of other seeds. When the machine-learned model of a seed s $ML_s$ is applied to training data of a different seed s', the machine-learned model $ML_s$ may be applied to the set of features for seed s' that are common between the two seeds.

Figure 7:
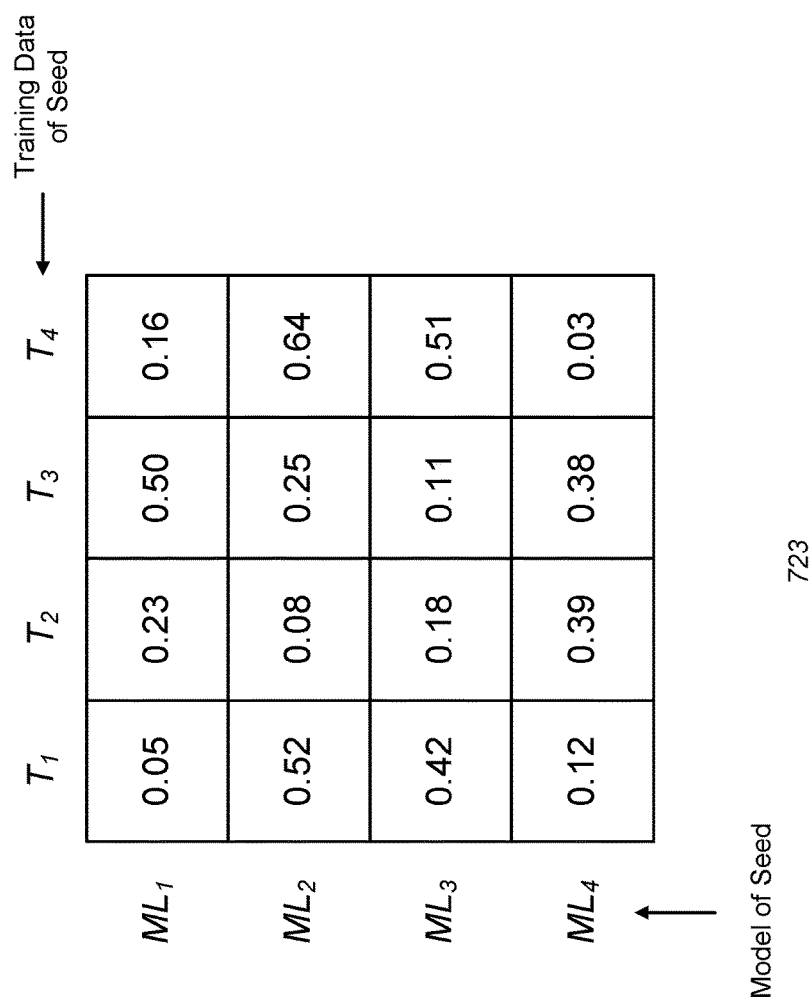
FIG. 7 illustrates an example similarity matrix generated by the similarity analysis module, in accordance with an embodiment.

FIG. 7 illustrates an example similarity matrix 723 generated by the similarly analysis module 422, in accordance with an embodiment. As shown in FIG. 7, the example similarity matrix 723 is constructed for 4 seeds. Each element in the similarity matrix 723 is the evaluated error of the machine-learned model $ML_s$ constructed based on the seed in the corresponding row of the element, applied to the training data $T_s$ of the seed in the corresponding column of the element. As shown in FIG. 7, the diagonal elements of the similarity matrix 723 show significantly small error, as the elements indicate the performance of machine-learned models on training data that was used or is similar to the data used to construct the models. As indicated in the small error for machine-learned model $ML_4$ applied to training data $T_1$, some machine-learned models perform relatively well on training data associated with other seeds, indicating reasonable confidence that variables of interest for both seeds may be predicted using a common machine-learned model. In one embodiment, when it is computationally burdensome to calculate all the elements of the similarity matrix, the similarity analysis module 422 may use techniques such as random sampling to estimate the missing elements.

Returning to FIG. 4, the shared model generator 426 generates shared models for one or more j clusters of seeds. Each cluster represents a group of seeds in which the variables of interest for the group of seeds can reasonably be predicted by a shared model commonly used across the seeds. The S seeds are divided into j clusters based on the performance of a model for one seed on data of the other seeds, as indicated in the similarity matrix. Specifically, the shared model generator 426 decomposes the similarity matrix into a set of vectors that correspond to each seed, and the vectors are provided to the clustering module 418 along with the desired numbers of clusters j such that the clustering module 418 can generate the different numbers of clusters.

In one instance, the set of vectors are the individual columns of the similarity matrix. In such an instance, a distance metric between two seeds represent similarity between the performance of a model for a first seed on data of other seeds and the performance of a model for a second seed on data of other seeds. In another instance, the set of vectors are the individual rows of the similarity matrix. In such an instance, a distance metric between two seeds represent similarity between the performance of the models on data of a first seed and the performance of the models on data of a second seed. In other instances, the set of vectors are extracted from the similarity matrix through various decomposition methods of the matrix.

A shared model for each cluster is constructed based on the aggregated training data of the seeds assigned to each cluster. Specifically, the shared model generator 426 aggregates the training data for the seeds assigned to each cluster and provides this to the training module 414 such that a shared model for each cluster is constructed based on the aggregated training data. Thus, a set of machine-learned models $\{ML_1, ML_2, \ldots, ML_j\}$ are generated for j clusters that are specific to the group of categories assigned to each cluster, while computationally-effective for the online system 110 compared to using individual models $\{ML_1, ML_2, \ldots, ML_S\}$ for each seed. The series of shared models $\{ML'_1, ML'_2, \ldots, ML'_j\}$ are updated periodically as new training data is generated from instances associated with the clusters.

In one embodiment, instead of constructing a complete similarity matrix and clustering the seeds based on the vectors of the similarity matrix, the shared model generator 426 may generate the j clusters by heuristics such as sampling the similarities between the machine-learned models and training data for the individual seeds. For example, the shared model generator 426 may represent the seeds as vertices in a weighted or un-weighted graph that are connected to each other based on sampling the similarities of the models and training data.

Subsequently, the shared model generator 426 may apply algorithms such as stochastic block modeling that identifies clusters (or "communities) of seeds based on the topology of the graph and construct the set of machine-learned models for each of the identified clusters. This allows the shared model generator 426 to identify clusters in a more computationally inexpensive manner since sampling does not require a complete similarity matrix indicating the performance of each machine-learned model on training data of each seed.

In one embodiment, the shared model generator 426 identifies the optimal number of shared models by dividing the S seeds into different numbers of clusters $j \in \{1, 2, \ldots, S\}$, and determining the optimal number $J^* \leq S$ that minimizes a loss. Specifically, for each number of requested clusters j, the shared model generator 426 calculates a loss $L_j$ for the number of clusters j based on the error of the generated models, and identifies the optimal number that results in the minimum loss $L_{J^*}$. In one embodiment, the loss is the error across each of the machine-learned models generated for the j clusters. For example, the loss $L_3$ for a set of machine-learned models $\{ML_1, ML_2, ML_3\}$ generated for j=3 corresponding clusters may be the statistical average of the evaluated errors for the three models. In another embodiment, the loss is the error across each of the generated models combined with a penalty term indicating the computational complexity of constructing and maintaining j machine-learned models.

Figure 8A:
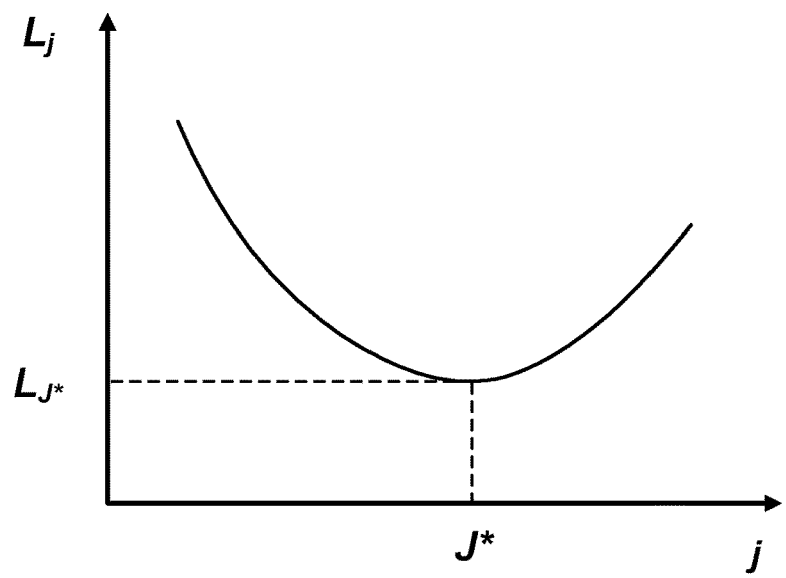
FIGS. 8A and 8B illustrate example relationships between loss and the number of machine-learned models, in accordance with an embodiment.
Figure 8B:
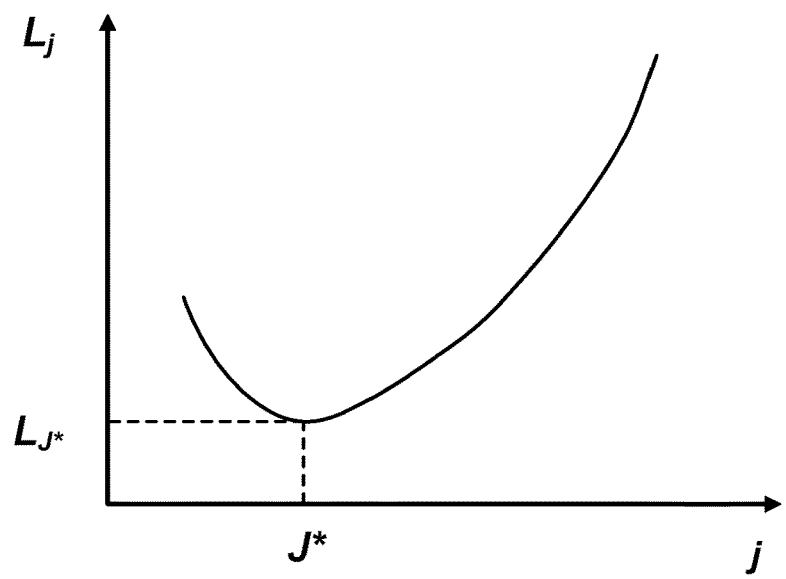

FIGS. 8A and 8B illustrate example relationships between loss $L_j$ and the number of machine-learned models j, in accordance with an embodiment. As an example, the loss in FIG. 8A indicates an average error across the machine-learned models generated for j clusters. As shown in FIG. 8A, when the number of models j is larger than the optimal number $J^*$, the loss $L_j$ increases as j increases since the amount of training data per model is decreased due to dividing the seeds into a large number of small clusters. In contrast, when the number of models j is smaller than the optimal number $J^*$, the loss $L_j$ increases as j decreases since a small number of machine-learned models may lack prediction accuracy due to the lack of specificity for each category. When the optimal number of machine-learned models is used, the loss is minimized at $L_{J^*}$. As another example, the loss in FIG. 8B indicates an average error across the models generated for j clusters combined with a penalty term for the computational complexity due to the number of models j for the same set of categories in FIG. 8A. As shown in FIG. 8B, the optimal number of models $J^*$ is smaller than that of the example in FIG. 8A because of the added penalty term for maintaining multiple models.

In one embodiment, the shared model generator 426 recursively repeats the process of identifying clusters and generating machine-learned models for the clusters. Specifically, the seeds of the next recursive level are the identified clusters of seeds in the previous recursive level. Machine-learned models for the new seeds are trained based on the aggregated training data for the seeds in the corresponding cluster. The shared model generator 426 may recursively identify clusters based on the new seeds and construct another set of machine-learned models based on the identified clusters of new seeds.

Returning to FIG. 4, the failure detection module 430 is responsible for generating and maintaining the general model 348, and resolving possible failure issues with the shared models 344 indicated in the flagged events received from the predictive module 314. The failure detection module 430 requests a general model 348 to be constructed based on the aggregated training data of all seeds from the training module 414. The requested general model 348 may be essentially equivalent to a machine-learned model generated based on a single cluster, and is used to predict variables of interest for instances when the shared models 344 show signs of possible failure. In addition, responsive to receiving flags regarding the custom models 344, the failure detection module 430 triggers appropriate modules of the model generation module 310 such that the issue may be resolved.

For example, responsive to receiving a flag from the predictive module 314 that values for one or more features are no longer available for sponsored content items associated with a content provider 114, the failure detection module 430 may request the feature extraction module 410 to eliminate the features from the training data of the content provider 114, and request the training module 414 to re-train the custom model 344 associated with the content provider 114 without the eliminated features.

Figure 9:
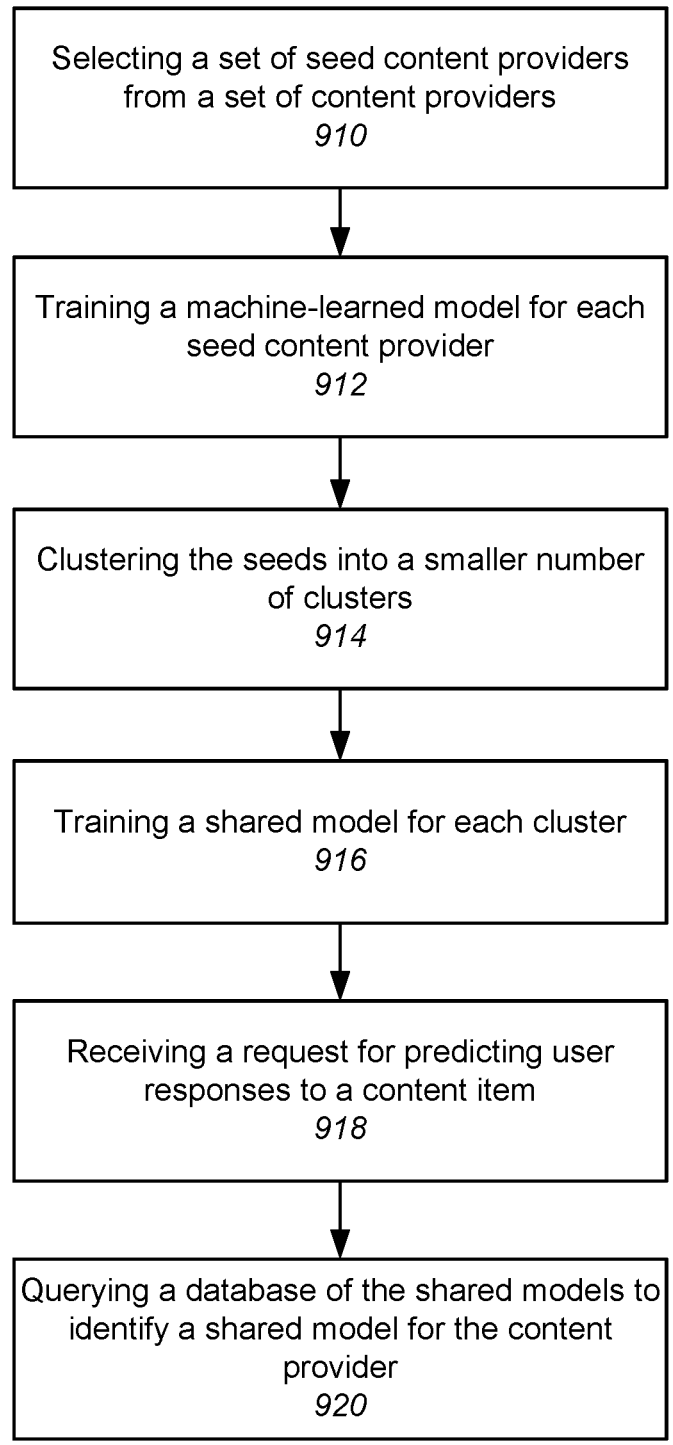
FIG. 9 is a flowchart illustrating a process of a content provider system generating predictions for sponsored content items and using the predicted values to present the sponsored content items to users of the online system, in accordance with an embodiment.

FIG. 9 is a flowchart illustrating a process of an online system predicting user responses to a content item associated with a content provider, in accordance with an embodiment.

The online system selects 910 a set of seed content providers from a set of content providers. For each seed, the online system trains 912 a model that predicts a likelihood that a user will perform an interaction with a content item provided by the seed content provider. The seeds are clustered 914 into a smaller number of clusters based on the performance of each model for a corresponding seed on data of the other seeds. The number of the clusters is smaller than the number of seeds. For each of the clusters, the online system trains 916 a shared model for the seeds of the cluster.

The online system receives 918 a request for predicting user responses to a content item associated with a content provider. The system queries 920 a database of the shared models to identify a shared model for the content provider.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   selecting a set of seed content providers from a set of content providers;
   for each seed content provider, training a model that predicts a likelihood that a user will perform an interaction with a content item provided by the seed content provider;
   for each seed content provider, applying the trained model for the seed content provider to validation datasets of other seed content providers in the set of seed content providers to obtain performance metrics for the seed content provider, the performance metrics indicating performance of the trained model for the seed content provider on the validation datasets of the other seed content providers;
   clustering the set of seed content providers based on similarity between the performance metrics of the set of seed content providers, wherein a number of the clusters are smaller than a number of the set of seed content providers; and
   for each of the clusters, training a shared model for all of the seed content providers of the cluster.

2. The method of claim 1, further comprising:
   receiving a request for predicting user responses to a content item associated with a content provider; and
   querying a database of the shared models to identify a shared model for the content provider.

3. The method of claim 1, further comprising:
   assigning a content provider that is not a seed content provider to a cluster.

4. The method of claim 3, further comprising re-training the shared model for the seed content providers of the cluster and the content provider assigned to the cluster.

5. The method of claim 1, wherein the clusters are determined based on a distance metric, where the distance metric between a first seed content provider and a second seed content provider in the set of seed content providers indicates similarity between the performance metrics of the trained model for the first seed content provider on the validation dataset of seed content providers other than the first seed content provider and the performance metrics of the trained model for the second seed content provider on the validation dataset of seed content providers other than the second seed content provider.

6. The method of claim 1, wherein the clusters are determined based on a distance metric, where the distance metric between a first seed content provider and a second seed content provider in the set of seed content providers indicates similarity between performance of the trained models for seed content providers other than the first seed content provider on the validation dataset of the first seed content provider and performance of the trained models for seed content providers other than the second seed content provider on the validation dataset of the second seed content provider.

7. The method of claim 1, wherein the number of the clusters is determined to minimize a loss indicating predictive error of the shared models.

8. The method of claim 7, wherein the loss further indicates computational complexity of the shared models.

9. The method of claim 1, wherein for each of the clusters, the shared model for the cluster is trained based on aggregated data of the seed content providers of the cluster.

10. The method of claim 1, further comprising training a general model for all seed content providers in the set of seed content providers.

11. A method comprising:
  receiving a request for predicting user responses to a content item associated with a content provider;
  querying a database of a plurality of shared models to identify a shared model for the content provider, where the plurality of shared models are generated by:
    selecting a set of seed content providers from a set of content providers,
    for each seed content provider, training a model that predicts a likelihood that a user will perform an interaction with a content item provided by the seed content provider,
    for each seed content provider, applying the trained model for the seed content provider to validation datasets of other seed content providers in the set of seed content providers to obtain performance metrics for the seed content provider, the performance metrics indicating performance of the trained model for the seed content provider on the validation datasets of the other seed content providers,
    clustering the set of seed content providers based on similarity between the performance metrics of the set of seed content providers, wherein a number of the clusters are smaller than a number of the set of seed content providers, and
    for each of the clusters, training a shared model for all of the seed content providers of the cluster to generate the plurality of shared models; and
  predicting the user responses for the content item associated with the content provider by using the identified shared model.

* * * * *